United States Patent [19]

Jaulmes

[11] 4,271,690
[45] Jun. 9, 1981

[54] ANTITHEFT DEVICE FOR TWO-WHEELED VEHICLES

[75] Inventor: Christian Jaulmes, Paris, France

[73] Assignee: Ateliers de la Motobecane, Pantin, France

[21] Appl. No.: 51,751

[22] Filed: Jun. 25, 1979

[30] Foreign Application Priority Data

Sep. 4, 1978 [FR] France .............................. 78 25385

[51] Int. Cl.³ .................... B62H 5/00; B62H 5/16; E05B 71/00
[52] U.S. Cl. .................................... 70/233; 70/227; 70/234; 280/289 L
[58] Field of Search ............ 70/234, 233, 227, 39, 70/26, 18, 15, 235; 280/289 L

[56] References Cited

U.S. PATENT DOCUMENTS

| 524,527 | 8/1894 | Hall | 70/227 X |
| 616,845 | 12/1898 | Johnson | 70/15 X |
| 1,338,131 | 4/1920 | Hendricks | 70/39 X |
| 2,248,971 | 7/1941 | Duffy | 280/289 L |
| 3,766,757 | 10/1973 | Storey | 70/18 |
| 3,805,564 | 4/1974 | Velardo | 70/233 X |
| 3,968,665 | 7/1976 | Kaufman | 70/234 |
| 4,135,374 | 1/1979 | Goral | 70/18 |

FOREIGN PATENT DOCUMENTS

| 236744 | 3/1910 | Fed. Rep. of Germany | 70/227 |
| 872347 | 6/1942 | France | 70/227 |
| 3657 | 5/1919 | Netherlands | 70/227 |
| 588582 | 5/1947 | United Kingdom | 70/233 |

Primary Examiner—Roy D. Frazier
Assistant Examiner—Carl F. Pietruszka
Attorney, Agent, or Firm—Browdy and Neimark

[57] ABSTRACT

An antitheft device for two-wheeled vehicles includes a U-shaped fork whose central portion is articulated on the vehicle. The two branches pivot about an axis defined by the central portion in planes substantially parallel to the longitudinal plane of symmetry of the vehicle. In a first position, ends of the branches are located near respective sides of a wheel of the vehicle. In a second position the ends are located on sides of a support member. In a third position the ends of the branches are located to the rear of the vehicle. In each of the positions, a locking member, preferably in the form of a bar removably connects the two ends. The locking member includes a key operated lock whose bolt cooperates with an orifice or bore near one end of the U-shaped fork, the orifice or bore acting as a keeper for the bolt.

8 Claims, 3 Drawing Figures

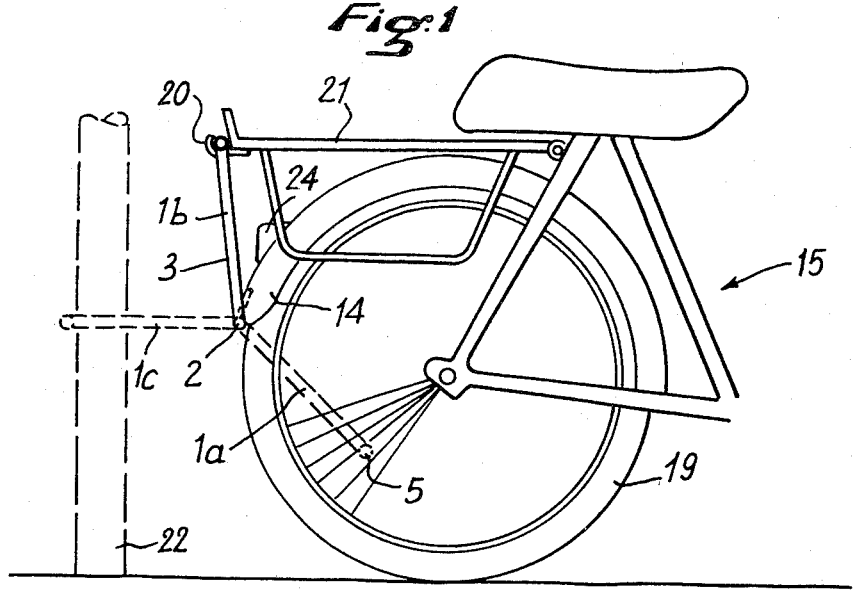
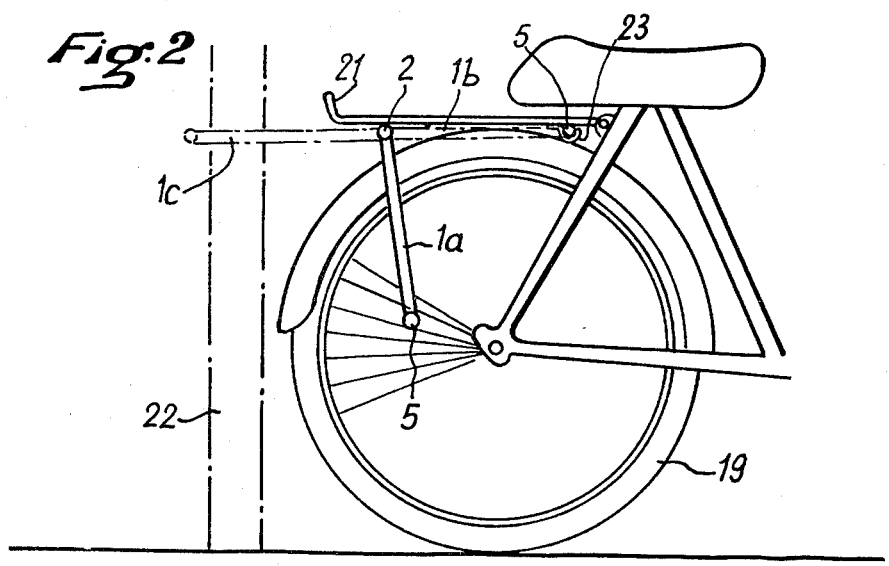
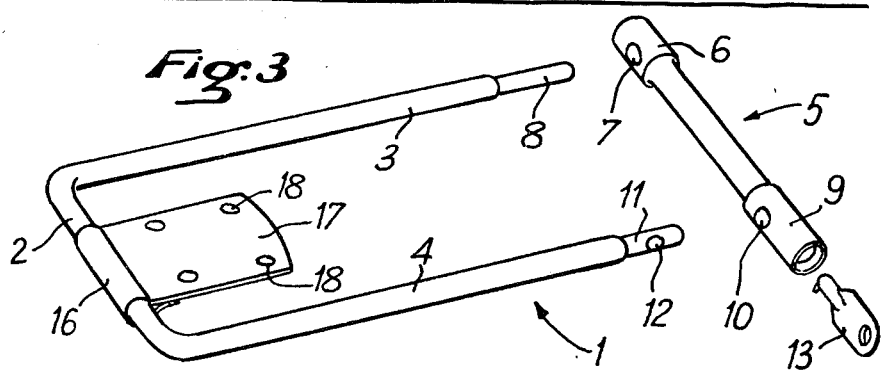

ANTITHEFT DEVICE FOR TWO-WHEELED VEHICLES

BACKGROUND OF THE INVENTION

This invention relates to an antitheft device for two-wheeled vehicles and, more particularly, to such a device which can be used to secure the vehicle to a post or the like and alternatively to one of its wheels and which can be readily carried by the vehicle.

Known antitheft devices involve either, in a very simple way, the use of a chain or steel cable used to shackle one of the vehicle wheels or the use of a lock which makes it possible to lock the front fork of the vehicle in a position where it forms a substantially certain angle with the longitudinal plane of symmetry of the vehicle. The first type of these known devices has the drawback of being unaesthetic and, moreover, the chain or cable, which must be carried, has a certain inconvenience when the vehicle is being used. The second type of the known device is more expensive and fragile, and does not, like the first, allow the vehicle to be fastened to an object fastened in the ground such as a pole, the base of a light post and the like.

SUMMARY OF THE INVENTION

It is an object of the present invention to provide an antitheft device that remedies the aforementioned drawbacks, is simple, is effective and is relatively inexpensive.

The foregoing object, as well as others which are to become clear from the text below, is achieved by providing a device which includes a U-shaped fork whose central portion is articulated on the vehicle substantially perpendicular to the longitudinal plane of symmetry of the vehicle and whose two branches are able to pivot in planes substantially parallel to the plane of symmetry and are located on respective sides of the plane of symmetry between a first position where ends of the two branches are located on respective sides of one of the wheels of the vehicle, a second position where these ends are located on respective sides of a support member, and a third position where the two branches are oriented so that their ends, when in a theft-preventing position, are positioned lengthwise from the vehicle. The antitheft device additionally includes a locking member suitable for connecting the ends of the two branches, cooperative with the spokes of the wheel in the first position, with the support member in the second position, and with a device, such as a post, apart from the vehicle in the third position.

Consequently, in the first position where the branches of the fork enclose one of the vehicle wheels, the locking member shackles this wheel and, consequently, prevents use of the vehicle. In the second position, where the locking member rests on the support member, the vehicle can be used freely without the antitheft device presenting any inconvenience. Finally, in the third position where the branches of the fork are extended from the vehicle, the branches with the locking member may encompass a fixed object, such as a pole or the like, and consequently, hold the vehicle to this object.

The locking member can have the shape of a bar and the support member the shape of a channel, having a complementary section into which the branches may fit. In this case, to use the vehicle, it suffices to remove the locking bar to free the vehicle, then put the fork in its second position and put back the locking bar to keep the fork in this second position.

According to the characteristics of a vehicle with which the antitheft device is to be associated, the support member can be located approximately either in the same horizontal plane or in the same vertical plane as the U-shaped fork.

Advantageously, the locking member includes an incorporated lock whose bolt is made to cooperate with an orifice in the form of a keeper provided at the end of one of the two branches.

BRIEF DESCRIPTION OF THE DRAWINGS

The invention can be better understood from the following specification, given by way of non-limiting example, of embodiments of the invention, reference being made to the accompanying drawings.

FIG. 1 represents a side view of a two-wheeled vehicle equipped with an antitheft device according to a first embodiment the present invention.

FIG. 2 is a side view of a vehicle equipped with a second embodiment of the present invention.

FIG. 3 is a perspective view of an embodiment of the fork and locking member according to the invention.

DETAILED DESCRIPTION OF THE PREFERRED EMBODIMENTS

As shown in FIGS. 1 and 2, the invention provides an antitheft device which includes a fork and a lock member which can be constructed as shown in FIG. 3. The fork is made from a steel bar bent approximately 90° at both two points to form a central portion 2 and two branches 3 and 4 which extend perpendicular to the central portion 2. A locking member in the form of a bar, also of steel, is also provided. One end 6 of the locking member 5 includes an orifice 7 in which an end 8 of reduced circumference of the branch 3 of the fork 1, and whose other end forms a lock 9 whose bolt slides lengthwise to the locking member 5, i.e., crosswise to an orifice 10 in the locking member 5 into which an end 11 of reduced circumference, of the other fork branch 4 penetrates, this end including an orifice or bore 12 in the form of a keeper into which the bolt of lock 9 can engage. The lock 9 is operated with a key 13 in a conventional manner.

In the embodiment shown in FIG. 1, the fork 1 is fastened to a mudguard 14 of a two-wheeled vehicle 15 by a metal sheet 16 bent to form a hinge and having an extension plate 17 equipped with orifices 18 making it possible to fix the sheet 16 by screw bolts, rivets or the like onto the mudguard 14 so that the central portion 2 of the fork 1 is articulated in a plane substantially perpendicular to the longitudinal plane of symmetry of the vehicle 15. In a first position 1a, the fork is placed so that its branches 3, 4 are on respective sides of a wheel 19 of the vehicle 15 and the locking member 5, in the form of a bar, shackles the spokes of the wheel 16. In a second position 1b, the fork 1 is substantially vertical so that locking member 5 rests on a support member 20 fastened to a luggage carrier 21 of the vehicle 15. Position 1b is that adopted when the vehicle is in use. Finally, in its third position 1c, the branches 3, 4 of the fork 1 are positioned to the rear of the vehicle 15 so that, with the locking member 5, they can, for example, enclose a post 22 or the like fastened in the ground, the antitheft device remaining attached to the vehicle 15 by the plate 17.

In the embodiment represented in FIG. 2, the central portion of the fork 1 is articulated on the luggage carrier 18 of the vehicle so that the fork 1 can also take three positions, a position 1a in which the locking member 5, in the form of a bar shackles the spokes of the wheel 16, a position 1b in which the locking member 5 rests against a fender of the wheel 19, the device being fastened to the vehicle by the plate 17 so that the fork 1 is approximately horizontal and allows use of the vehicle, and a third position 1c in which the ends of the fork 1 are positioned to the rear of the vehicle so that, with the locking member 5, they can enclose a post 22 or the like fastened into the ground.

The embodiment of FIG. 1 is particularly applicable to a vehicle which has saddlebags because they do not interfere with the movement of the fork 1. Further, in its rest position 1b, the fork 1 forms a bumper which makes it possible, for example, to protect light elements such as a tail light 24. On the other hand, the embodiment shown in FIG. 2 offers the advantage of greater aesthetics because, when the vehicle is being used, the fork 1 is hidden under the luggage carrier. On the other hand, this embodiment can obviously not be used in case the vehicle is provided with saddlebags.

The foregoing description and accompanying drawings relate to preferred embodiments of an antitheft device given by way of example, not by way of limitation. Numerous other embodiments and variants are possible without departing from this spirit and scope of the invention, its scope being defined in the appended claims.

What is claimed is:

1. An antitheft device for two-wheeled vehicles having a longitudinal plane of symmetry, the device comprising a U-shaped fork whose central portion is articulated on the vehicle about an axis substantially perpendicular to the plane of symmetry of the vehicle and whose two branches are rigid and pivot about said axis which is defined by said central portion in respective planes substantially parallel to the plane of symmetry and are located on respective sides of this plane between a first position where ends of said branches are located in vicinity of respective sides of a wheel of the vehicle, a second position where said ends straddle a rigid support member and a third position where said branches are positioned with their ends separated lengthwise from the vehicle so as to straddle a device independent of and spaced from the vehicle, and a locking member able to connect said ends of said branches, said locking member extending between spokes of the wheel in said first position, cooperating with said support member in said second position, and straddling a device spaced from and independent of the vehicle in said third position.

2. An antitheft device according to claim 1, wherein said locking member has the shape of a bar, said support member including a channel having a complementary section with respect to said locking member.

3. An antitheft device according to claim 1 or claim 2, wherein said one of said branches has an orifice or bore near one end thereof and said locking member includes a lock whose bolt cooperates with said orifice or bore provided at the vicinity of one of said ends of said branches of said U-shaped fork.

4. An antitheft device according to claim 1 or claim 2, wherein said support member is located substantially in the same vertical plane as said central portion of said U-shaped fork.

5. An antitheft device according to claim 4, wherein said one of said branches has an orifice or bore near one end thereof and said locking member includes a lock whose bolt cooperates with said orifice or bore provided at the vicinity of one of said ends of said branches of said U-shaped fork.

6. An antitheft device according to claim 1 or claim 2, wherein said support member is located substantially in the same horizontal plane as said central portion of said U-shaped fork.

7. An antitheft device according to claim 6, wherein said one of said branches has an orifice or bore near one end thereof and said locking member includes a lock whose bolt cooperates with said orifice or bore provided at the vicinity of one of said ends of said branches of said U-shaped fork.

8. An antitheft device according to claim 1 or claim 2, wherein said central portion of said U-shaped fork has a circular section, the device further comprising a sheet metal plate bent to form a hinge, said plate defining an extension fastened onto a fixed part of the vehicle and a passage of circular section, and, wherein said central portion extends through said passage.

* * * * *